United States Patent [19]
Patton

[11] Patent Number: 5,956,992
[45] Date of Patent: Sep. 28, 1999

[54] SPREADING, CRUSHING OR CUTTING DEVICE

[76] Inventor: Tommy L. Patton, 1842 W. 11th St., #A and B, Upland, Calif. 91786

[21] Appl. No.: 09/012,934

[22] Filed: Jan. 24, 1998

Related U.S. Application Data

[60] Provisional application No. 60/036,276, Jan. 24, 1997.
[51] Int. Cl.[6] .................................................. B21D 31/04
[52] U.S. Cl. ............................................ 72/392; 72/452.1
[58] Field of Search .................................. 72/392, 452.1; 74/104, 107; 269/233; 294/95, 116

[56] References Cited

U.S. PATENT DOCUMENTS

| | | | |
|---|---|---|---|
| 1,575,185 | 3/1926 | Stenhouse | 294/116 |
| 2,447,401 | 8/1948 | Ferguson et al. | 72/392 |
| 3,570,835 | 3/1971 | McPherson | 74/107 |
| 4,333,330 | 6/1982 | Porter | 72/392 |
| 4,886,635 | 12/1989 | Forster et al. | 294/116 |
| 5,301,533 | 4/1994 | Jackson | 74/107 |

*Primary Examiner*—Lowell A. Larson
*Attorney, Agent, or Firm*—Albert O. Cota

[57] ABSTRACT

A device (10) that is designed to spread, crush or cut pieces of metal or other materials. The device (10) is particularly adaptable for removing material from a vehicle in which is located a trapped accident victim. The device (10) consists of a first arm assembly (12) which functions in combination with an interlocking second arm (46). The first arm assembly (12) and the second arm (46) operate with a drive-mechanism yoke (100) that pivotally attaches the lower ends (22) on the first arm assembly (12) and the second arm (46). The device also include a drive yoke (50) which includes a pair of cam pins (94,96) that traverse a cam slot (26) located on each arm. The drive yoke (50) includes a drive rod (86) connected to a linear actuating mechanism (172). When the mechanism (172) is in a retracted position, the first arm assembly (12) and the second arm (46) close, and when the mechanism (172) moves upward into a non-retracted position, the two arms open.

18 Claims, 6 Drawing Sheets

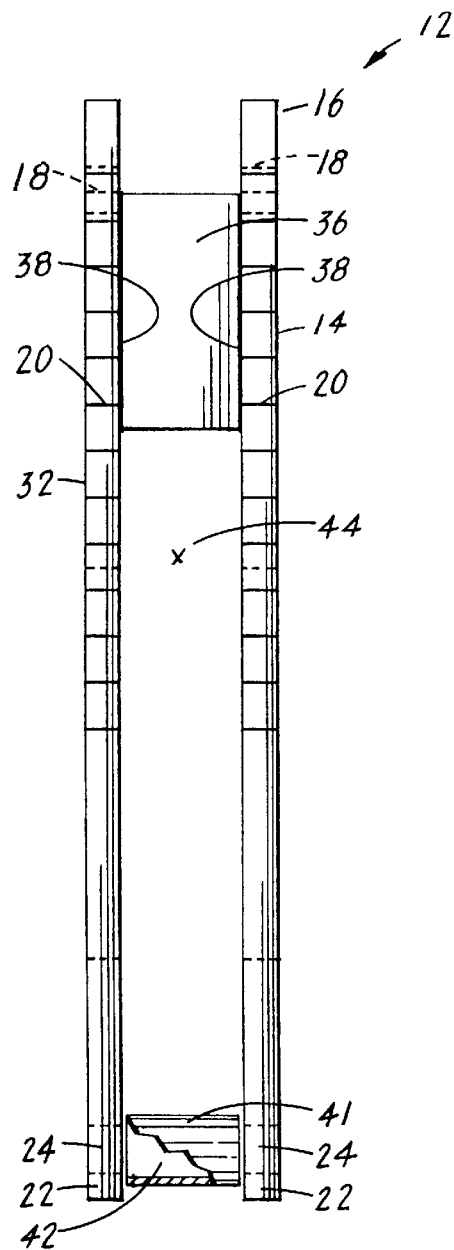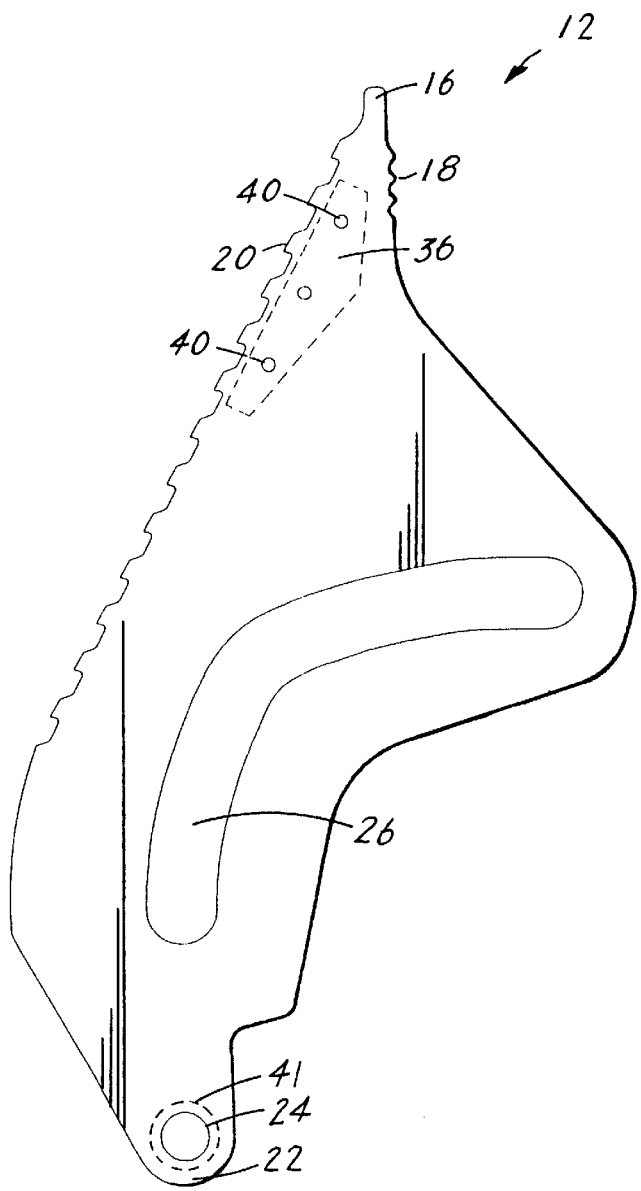
Fig. 3
Fig. 2

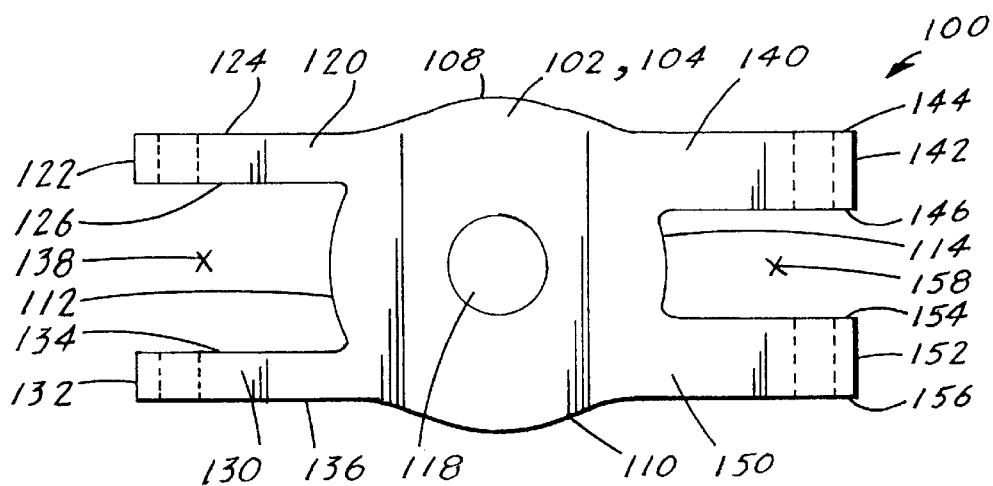

SPREADING, CRUSHING OR CUTTING DEVICE

This application claims benefit of Provisional Appln. Ser. No. 60/036,276 filed Jan. 24, 1997.

TECHNICAL FIELD

The invention pertains in general to devices which provide a spreading, crushing or cutting motion under high loads and more particularly to devices used for emergency rescue operations that are commonly referred to as "Jaws of Life"®.

BACKGROUND ART

As mankind has progressed, many of the methods and designs of commonplace life have become more advanced and varied vehicles are now the most prevalent mode of transportation, structures constructed of wood and metal are where we live and work, and even amusement parks, with rides that propel us at up to 100 mph, are where we spend our recreation time. Although these modern means undoubtably add a considerable positive influence to our lives, they do present their own unique problems.

One of the common aspects of the examples listed above, as well as many other items in our modern world, is that they all are constructed or made from materials designed to provide a high level of structural integrity. For the most part this level of structural integrity is not only useful for the design but also it provides a high level of protection. Unfortunately incidents occur that cause potentially dangerous situations.

For any person who works in an occupation that is responsible for rescuing and/or saving victims of accidents, their tools are often the only means by which to actually save a person's life. One of the most effective and widely used tools for rescuing a person is the "Jaws of Life"® type device. This type of device, of which there are several different design configurations, can be powered by different means as well, are used to free a trapped and often injured victim from within an enclosed space. A frequent scenario which necessitates the "Jaws of Life"® is when a passenger in a vehicle is trapped within a crushed and mangled section of the vehicle after an accident. As a result of some accidents, especially those that occur at high speeds or between dis-proportionately sized vehicles, one or more of the vehicles involved may have sustained such severe damage that the metal is deformed, creating extremely difficult removal of the passenger(s) within.

In the past, rescuers had to attempt to pry the metal apart with a crowbar, or similar prying tool, or they would be forced to saw the metal open. Another method that was used in the past was a high-temperature torch to cut through the metal. Unfortunately, if there was any gasoline or other flammable liquid spilled or in the atmosphere, the probability for a major accident to occur as a result of this was very high. Regardless of whichever of these methods was employed they all shared one major drawback, the amount of time required to use and successfully finish with those tools was often so long that the victim or victims within the vehicle(s) sometimes suffered more injuries or even death due to the length of time they were trapped.

Another major drawbacks of current rescue devices is that in order to provide the necessary torque, which is usually between 7,000 and 15,000 pounds, the device must have a high-level power source. This need directly effects the portability and ease-of-use characteristics of the device. It is clearly obvious that there is a need for a high-power, portable rescue device that is capable of being used by a single operator and that can be easily transported to the scene of an accident.

A search of the prior art did not disclose any patents that read directly on the claims of the instant invention, however the following U.S. patents are considered related:

| U.S. Pat. No. | INVENTOR | ISSUED |
| --- | --- | --- |
| 5,544,862 | Hickerson | 13 August 1996 |
| 5,425,260 | Gehron | 20 June 1995 |
| 5,297,780 | Hickerson | 29 March 1994 |

The U.S. Pat. No. 5,544,862 and the U.S. Pat. No. 5,297,780 disclose a light weight portable "jaws of life" spreading tool actuated by an electric motor. Full high torque at any position, with selectable spreading or cutting motions under high loads is achieved by the use of a rotary, multiple stage, speed reducing gearbox driven by the motor. The gearbox contains an input stage from the electric motor running on a 12 volt DO power supply, and a compound planetary output stage. The arms or jaws of the device are separately driven and for convenience, are attached to external rings on the gears, by heavy duty pins. The arms or jaws are removable for interchanging between cutting and spreading configurations, or replacement with general purpose arms capable of both cutting and spreading operations.

The U.S. Pat. No. 5,425,260 discloses an accident rescue tool having a base, a base arm fixedly attached to the base, and a lifting arm pivotably attached to the base. A means for pivoting the lifting arm toward the base arm is provided, as is a first chain connected to the base arm at one end and a rigid vehicle component at the other end and a second chain connected to the lifting arm at one end and a vehicle component at the second end. The pivoting means is connected to both the base arm and lifting arm to pivot the lifting arm so that the second chain causes the vehicle component to move in conjunction herewith.

DISCLOSURE OF THE INVENTION

The device disclosed herein is designed to spread, crush, clamp, cut, rip or pull pieces of metal or other materials. The device is particularly adaptable for removing material from a vehicle in which is located a trapped accident victim. In its basic form and function, the device consists of:

A. A first arm assembly comprising:
   (1) An upper arm having an upper end, a lower end having therethrough a drive-mechanism yoke bore, and a cam slot.
   (2) A lower arm substantially identical to the upper arm.
   (3) Means for forming a second arm space between the upper and lower arms.

B. A second arm having an upper end, a lower end having a drive-mechanism yoke bore therethrough, and a cam slot. The second arm has a width which allows the arm to slidably traverse the second arm space and interlock with the first arm assembly.

C. A drive yoke having:
   (1) A center section from where extends rearward a drive rod, a first side having a first slot dimensioned to slidably receive the first arm assembly and a second side having a second slot dimensioned to slidably receive the second arm.
   (2) A first bore that extends through the first slot and a second bore that extends through the second slot, (3) A first cam traversing structure inserted through the first bore and through the cam slots on the first arm assembly and a second cam traversing structure inserted through the second bore and through the cam slot on the second arm, and (4) Means for securing the first and second cam traversing structures, D. A drive-mechanism yoke having:

(1) A central section having a device driving means cavity and a substantially centered drive rod bore that extends through the cavity, and (2) A first side having a first slot dimensioned to receive and pivotally retain the lower ends of the upper and lower arms and a second side having a second slot dimensioned to receive and pivotally retain the lower end of the second arm, and E. A device driving means that is powered by a powering means and that incorporates a linear actuating mechanism that attaches to the drive rod. When the linear actuating mechanism is in a retracted position the first arm assembly and the second arm overlap into the interlock position. Conversely, when the linear actuating mechanism moves upward the drive rod moves upward causing the first and second cam traversing structures to move along the respective cam slot to cause the first arm assembly and the second arm to open outward.

The arms can be manufactured with or without teeth and can include a cutting blade that is removably attached to one of the blades. The arms, which are preferably made from a heat-treated steel, can be stacked to include up to four arms. The arm sets interlock to avoid the problem of racking or twisting that is common among devices that use a lever-type action that prevent the interlocking of arms.

The combination of the drive yoke and the cam slots allows the device to be designed for specific applications. The cam slots may be cut in a convex, concave or a linear shape depending on the use of the device.

In view of the above disclosure it is the primary object of the invention to provide a device that can be used for a variety of applications that require the spreading, crushing or cutting of a material. In addition to the primary object of the invention it is also an object of the invention to provide a spreading, crushing or cutting device that:

can be used by one or more persons, can be made in a variety of sizes with multiple arm configurations for different applications, is easily transported and stored, can be designed to be operated by various types of power sources, can apply an outward force or an inward force, can have arms that utilize teeth or grooves for grabbing or biting, is reliable and requires minimal maintenance, These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a top plan view of the upper arm that is an element of the first arm assembly.

FIG. 3 is an elevational side view of the first arm assembly showing the locations of the upper spacer and the lower spacer.

FIG. 5 also shows the location of the device driving means.

FIG. 9 is a front elevational view of the drive-mechanism yoke.

FIG. 10 is a top plan view of the drive-mechanism yoke.

FIG. 11 is a rear elevational view of the drive-mechanism yoke.

BEST MODE FOR CARRYING OUT THE INVENTION

Figure 1:
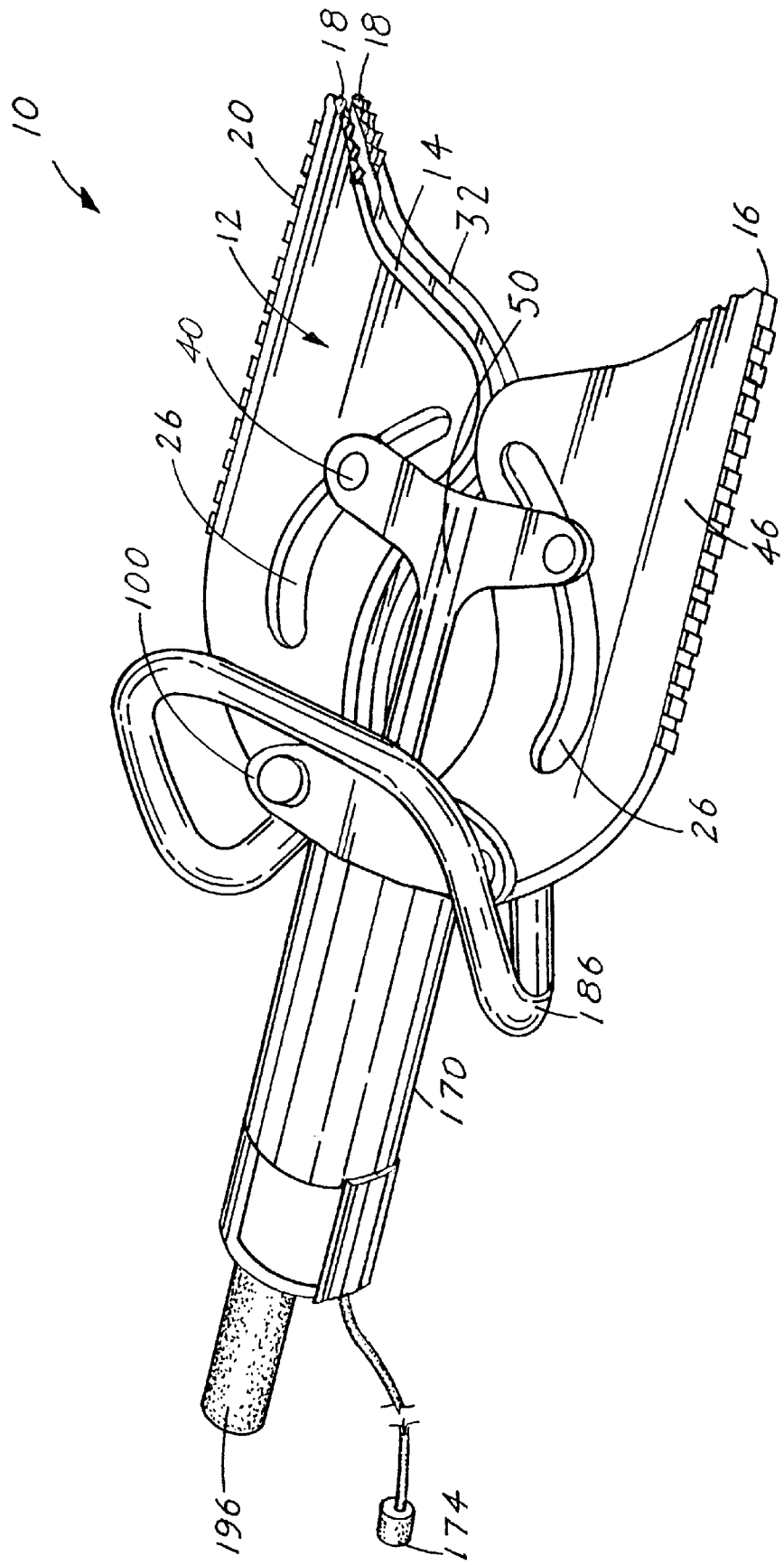
FIG. 1 is a perspective view of the spreading, crushing or cutting device.

The best mode for carrying out the invention is presented in terms of a preferred embodiment for a device which is designed to spread, crush or cut two or more pieces of metal or other material. The spreading, crushing or cutting device is particularly adaptable for assisting rescue workers who are attempting to free a person who is trapped within a damaged vehicle or other enclosed space. The device may also be used to raise or lower vehicles, machinery, buildings or other heavy objects. In essence, the device is considered an improvement on devices that have been commonly known in the art as "Jaws of Life"®.

The preferred embodiment of the spreading, crushing or cutting device 10, as shown in FIGS. 1–11, is comprised of the following major elements: a first arm assembly 12 consisting of an upper arm 14 and a lower arm 32, a second arm 46, a drive yoke 50, a drive-mechanism yoke 100, a device driving means 170, a device powering means 174, a forward handle 186 and a hand grip 196.

The device 10 can be designed to include a plurality of between two to four stacked arms. However, for the purpose of a structural description, a design that utilizes the first arm assembly 12 and the second arm 46 will be discussed. Regardless of the number of arms employed by the device 10, all the arm sets overlap and interlock. This interlocking alleviates the problem of racking or twisting which is common with other devices that utilize a lever-type action. By utilizing a device with two arms that overlap and interlock an opening into which the device 10 may be inserted can be smaller, thereby increasing the utility of the device 10.

The first arm consists of a first arm assembly 12 as shown in FIGS. 1, 2, 3, 4 and 5. The assembly 12 is comprised of an upper arm 14 and an identical lower arm 32. The upper and lower arms 14,32 are further comprised of pointed upper ends 16, a series of inward teeth 18, a series of outward teeth 20, a lower end 22, a drive-mechanism yoke bore 24 and a cam slot 26 that is best shown in FIG. 2. It should be noted that although teeth are not required, they are preferred.

The upper arm 14 is attached to the lower arm 32 by an upper spacer 36, as best shown in FIGS. 2 and 3. The upper spacer 36 is attached, by an attachment means, near and between the pointed upper ends 16 of the upper and lower arms 14,32. The preferred spacer attachment means 38 consists of a plurality of threaded machine screws 40, as shown best in FIG. 2. Between the upper and lower arms 14,32 is also located a lower spacer 41 that has a bore 42 therethrough. The lower spacer 41 is concentrically positioned between the drive-mechanism yoke bores 24 on the upper and lower arms 14,32, as shown in FIG. 3. The securing of the lower spacer 41 is described infra. The upper and lower spacers 36, and 41 form a second arm space 44 which is located between the upper and lower arms 14,32, as also shown in FIG. 3.

Figure 4:
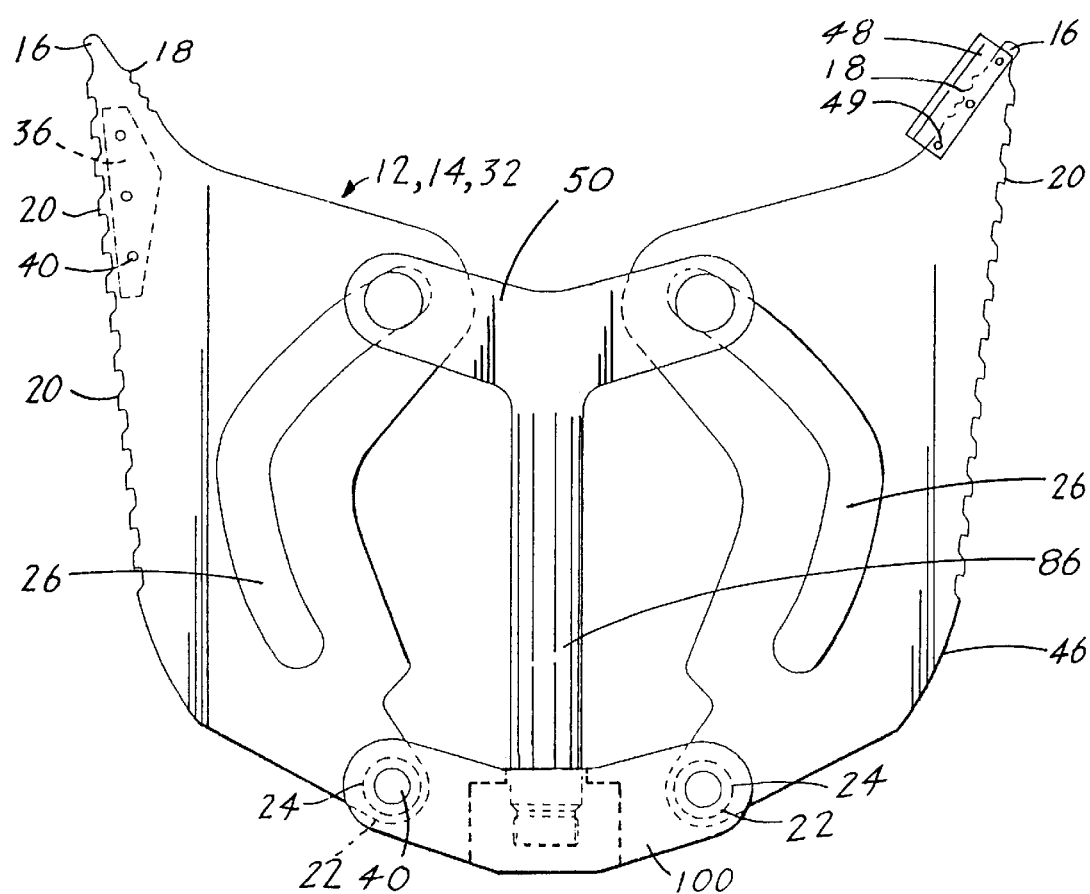
FIG. 4 is a top plan view of the device showing the first arm assembly and the second arm in an open position.
Figure 5:
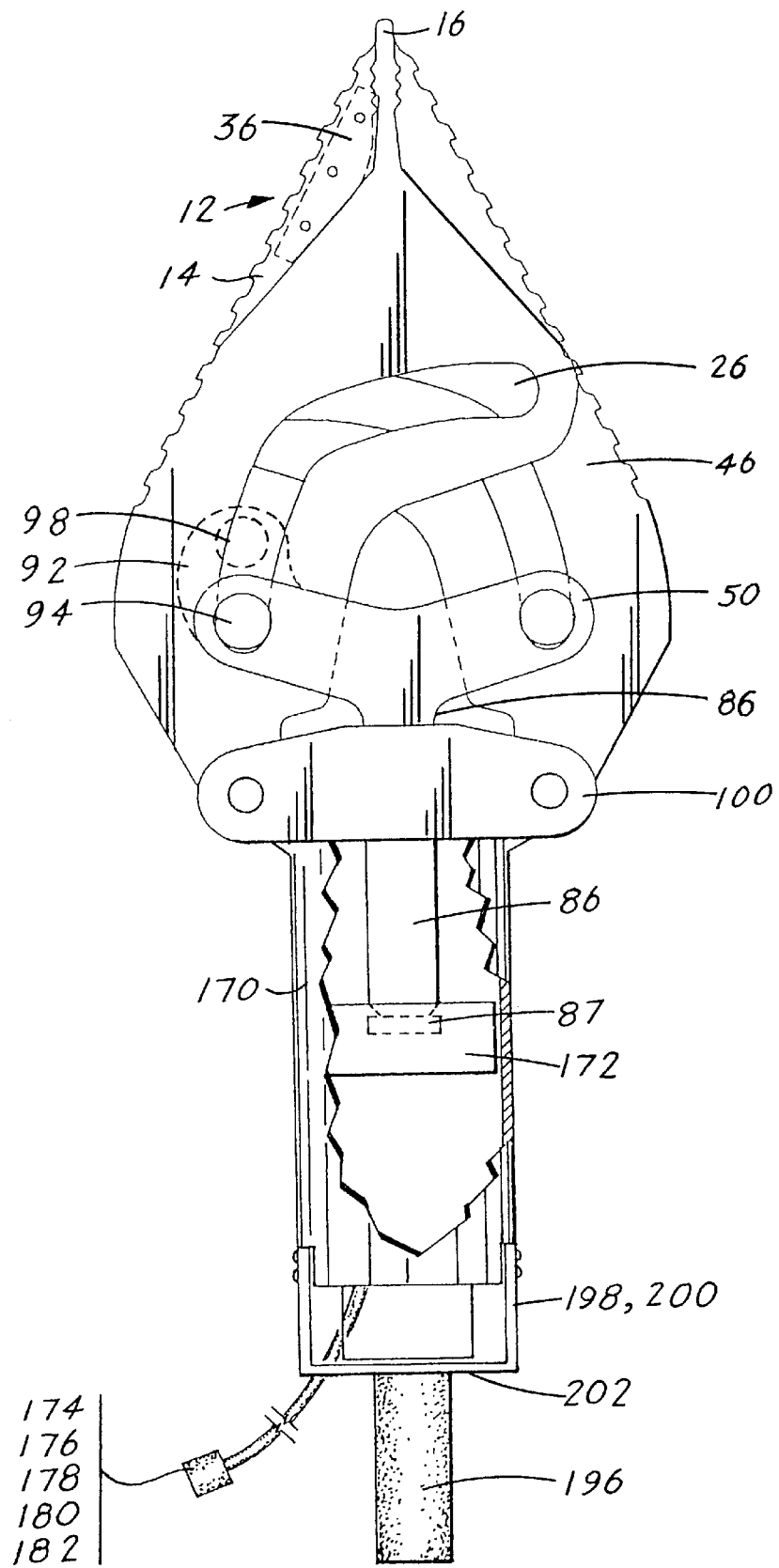
FIG. 5 is a top plan view of the device showing the second arm interlocked within the first arm assembly.

The second arm 46 is shown in an open position in FIG. 4, and in a closed position in FIG. 5. The second arm 46 also has a pointed upper end 16, a series of inward teeth 18 and outward teeth 20, a lower end 22, a drive-mechanism yoke bore 24 and a cam slot 26. The second arm 46 can be manufactured in a single piece having the required width, or can be laminated with two or more pieces to provide the required width. In either case, the upper and lower arms 14,32 and the second arm 46 are preferably constructed of a heat treated steel or other similar high-strength material.

The arms, in lieu of teeth, can have a flat surface (not shown) or a specially designed surface can be included to allow the device 10 to serve as a cutter. Additionally, as shown in FIG. 4, a removable cutting blade 48 can be attached by means of threaded machine screws 49 to the inward end of the second arm 46.

The cam slots 26 are preferably cut in a convex shape as shown in the figures. However, for special cases the cam slots can have a concave shape or a linear shape. The particular shape selected is dependent upon the specific use of the device. For example, if it is desired to have the two arms expand in a substantially parallel configuration, as would be required for a lifting or jacking operation, a convex cam slot as shown in FIG. 4 would be selected.

Figure 6:
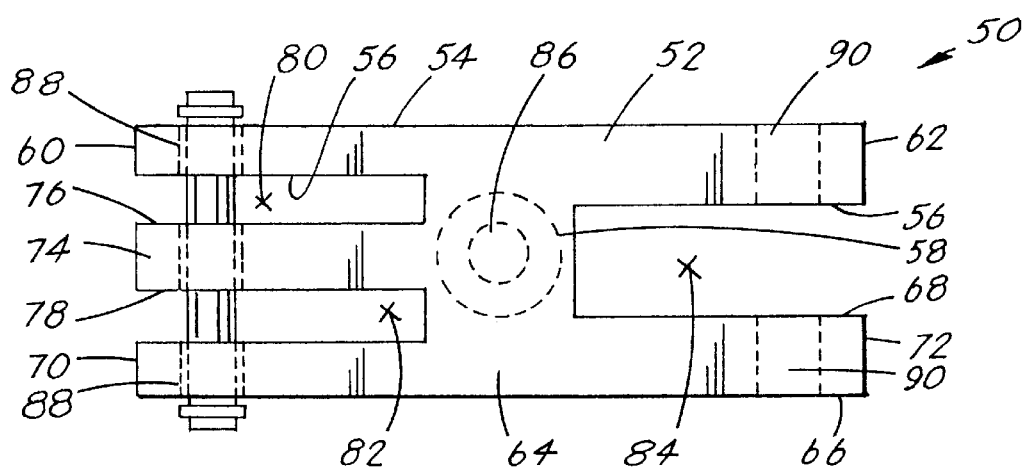
FIG. 6 is a front elevational view of the drive yoke.
Figure 7:
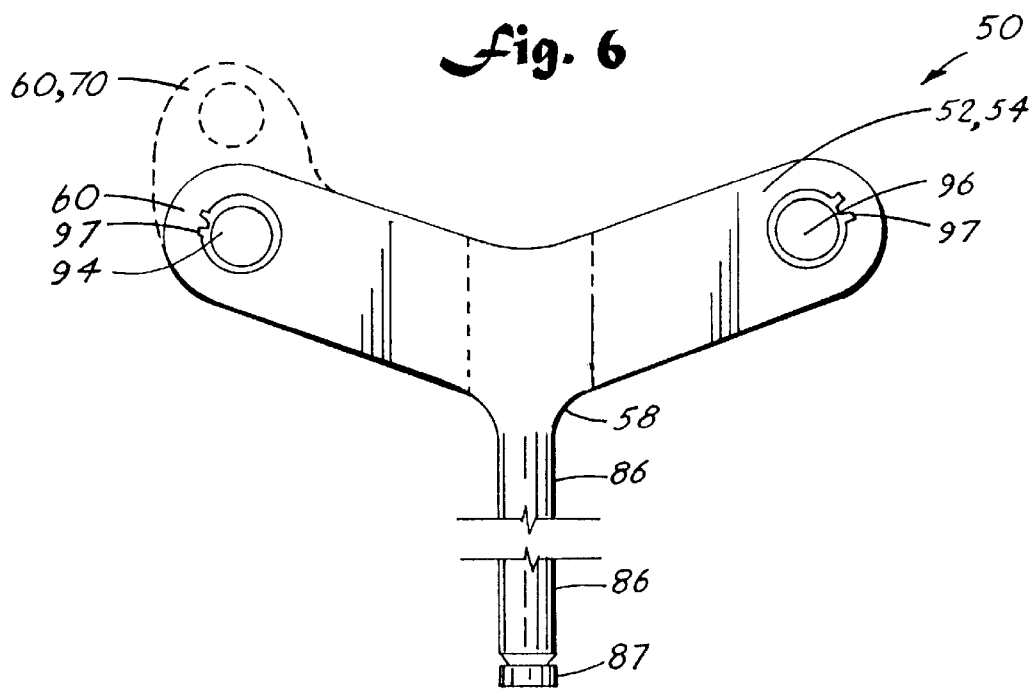
FIG. 7 is a top plan view of the drive yoke.
Figure 8:
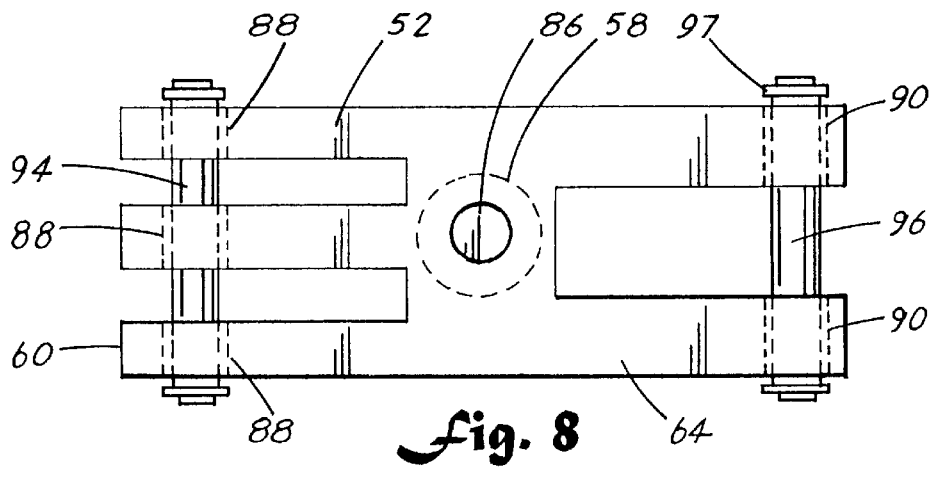
FIG. 8 is a rear elevational view of the drive yoke.

The drive yoke 50, as shown attached to the device in FIG. 4 and separated from the device 10 in FIGS. 6, 7 and 8, is comprised of an upper section 52, a solid center section 58, an integral lower section 64, an integral central protrusion 74, an integral drive rod 86, a first pin bore 88, a second pin bore 90, a first cam pin 94 and a second cam pin 96. In lieu of cam pins, the cam slots 26 can be traversed with a roller with or without ball bearings, stationary or articulated skids or any other structure that can slidably traverse the cam slots 26.

The upper section 52 has an upper surface 54, a lower surface 56 that terminates at the center section 58, a first side end 60 and a second side end 62. The integral lower section 64 also has a lower surface 66, an upper surface 68 that terminates at the center section 58, a first side end 70 and a second side end 72. The integral central protrusion 74, as shown in FIGS. 6 and 8, extends outward from the center section 58 and has an upper surface 76 and a lower surface 78. Between the lower surface 56 of the upper section 52, and the upper surface 76 of the central protrusion 74, is created a first slot 80. Likewise, a second slot 82 is created between the upper surface 68 of the lower section 64, and the lower surface 78 of the central protrusion 74. Through the first slot 80 traverses the upper arm 14 of the first arm assembly 12, and through the second slot 82 traverses the lower arm 32 of the first arm assembly 12. Between the lower surface 56 of the upper section 52, and the upper surface 68 of the lower section 64, is created a third slot 84. Through the third slot 84 traverses the second arm 46. The integral drive rod 86, as best shown in FIG. 7, extends rearward from the center section 58.

Adjacent the first side end 60 is located a first pin bore 88 that extends through the upper section 52, the central protrusion 74 and the lower section 64. Likewise, a second pin bore 90 is located adjacent the second side end 62 that extends through the upper section 52 and the lower section 64. The first cam pin 94 is inserted through the first pin bore 88 and through the cam slots 26 on the first arm assembly 12. The second cam pin 96 is likewise inserted through the second pin bore 90 and through the cam slot 26 on the second arm 46. The first and second cam pins 94,96 are secured by a securing means which preferably consists of a split washer 97 as best shown in FIG. 7. The drive yoke 50, as shown in FIG. 7, can also be designed to include two cam pins on each side. This is best accomplished by extending the first side ends 60,70 and the second side ends 62,72 as shown by the broken lines in FIG. 7. In some larger, heavier devices, the dual cam pins increase the structural integrity of the device.

The drive-mechanism yoke 100, as shown attached to the device 10 in FIGS. 4 and 5 and separated in FIGS. 9, 10 and 11. The yoke which can be configured as shown in FIG. 4 or as in FIG. 5 is comprised of a central section 102, a device driving means cavity 116, a substantially centered drive rod bore 118, a first upper section 120, a first lower section 130, a second upper section 140, a second lower section 150, a first pin bore 160, a second pin bore 162, a first swivel pin 164, and a second swivel pin 166.

The central section 102 has a front surface 104, a rear surface 106, an upper surface 108, a lower surface 110, a first side 112 and a second side 114. The device driving means cavity 116, as shown best in FIG. 10, extends inward from the rear surface 106 of the central section 102. Extending through the cavity 116 is the substantially centered drive rod bore 118. The first upper section 120 integrally extends outward from the intersection of the upper surface 108 and the first side 112 of the central section 102. The first upper section 120 includes an outer end 122, an upper surface 124 and a lower surface 126. The first lower section 130 integrally extends outward from the intersection of the lower surface 110 and the first side 112 of the central section 102. The first lower section 130 includes an outer end 132, an upper surface 134 and a lower surface 136. Between the lower surface 126 of the first Upper section 120 and the upper surface 134 of the first lower section 130 is created a first slot 138. The second upper section 140 integrally extends outward from the intersection of the upper surface 108 and second side 114 of the central section 102. The second upper section 140 includes an outer end 142, an upper surface 144 and a lower surface 146. The second lower section 150 integrally extends outward from the intersection of the lower surface 110 and the second side 114 of the central section 102. The second lower section 150 includes an outer end 152, an upper surface 154 and a lower surface 156. Between the lower surface 146 of the second upper section 140, and the upper surface 154 of the second lower section 150, is created a second slot 158.

The first pin bore 160, as shown in FIG. 11, extends through the first upper section 120 and the first lower section 130. The second pin bore 162, as also shown in FIG. 11, extends through the second upper section 140 and the second lower section 150. After the first pin bore 160 is aligned sequentially with the drive-mechanism yoke bore 24 on the upper arm 14, the lower spacer 41 and the drive-mechanism yoke bore 24 on the lower arm 32, a first swivel pin 164 is inserted and attached by an attachment means. Likewise, after the second pin bore 162 is aligned sequentially with the drive-mechanism yoke bore 24 on the second arm 46 and the second pin bore 162 on the second lower section 150, a second swivel pin 166 is inserted and attached by an attachment means 168 that typically consists of a bolt and nut combination.

The device driving means 170, as shown in FIG. 5, incorporates a linear actuating mechanism 172 that attaches to the drive rod attachment end 87 on the drive rod 86. When the linear actuating mechanism 172 is in a retracted position, the first arm assembly 12 and the second arm 46 overlap into the closed interlocked position as shown in FIG. 5. Conversely, when the linear actuating mechanism 172 moves upward into a non-retracted position, the drive rod moves upward causing the first cam pin 94 and the second cam pin 96 to move along the respective cam slots 26, thus causing the first arm assembly 12 and the second arm 46 to open. The device driving means 170 can be powered by the device powering means 174, which may utilize electricity 176, pneumatics 178, hydraulics 180 or by a pyrotechnic device 182.

The device driving means 170 causes the device 10 to operate by transforming the translating motion of the device driving means 170 into a rotary motion at the arms 12,46 as controlled by the cam angle. Typically, at an initial roll out of three degrees and utilizing a 12-inch (30.5 cm) arm, 30,000 lbs (11,196 Kg) of force on the drive rod 86 will produce a force of 55,000 lbs (20,526 Kg) at the upper end 16 of the arms 12,46. As the drive rod moves closer to the upper end 16, the force increases.

To allow the spreading, crushing or cutting device 10 to be held and steadied, a forward handle 186 and a hand grip 196 are utilized. The handle 186 includes a first end 188 having a first handle bore 190, and a second end 192 having a second handle bore 194. The first handle bore 190 is inserted over the first pin bore 160 prior to inserting and attaching the first swivel pin 164. The second handle bore 194 is likewise inserted over the second pin bore 162 prior to inserting and attaching the second swivel pin 166. The hand grip 196, as shown in FIG. 5, is attached by an attachment means 198 to a rear section of the device driving means 170. One such means, as also shown in FIG. 5, is a U-shaped bracket 200 having a horizontal section 202 to which is conventionally attached the hand grip 196.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A spreading, crushing or cutting device comprising:
   a) a first arm assembly comprising:
      (1) an upper arm having an upper end, a lower end having therethrough a drive-mechanism yoke bore, and a cam slot,
      (2) a lower arm substantially identical to said upper arm,
      (3) means for forming a second arm space between said upper and lower arms,
   b) a second arm having an upper end and a lower end having therethrough a drive-mechanism yoke bore, and a cam slot wherein said second arm has a width which allows said arm to slidably traverse the second arm space and interlock with the first arm assembly,
   c) a drive yoke having:
      (1) a center section from where extends rearward a drive rod, a first side having a first slot dimensioned to slidably receive said first arm assembly and a second side having a second slot dimensioned to slidably receive said second arm,
      (2) a first bore that extends through the first slot and a second bore that extends through the second slot,
      (3) a first cam traversing structure inserted through the first bore and through the cam slots on said first arm assembly and a second cam traversing structure inserted through the second bore and through the cam slot on said second arm,
      (4) means for securing said first and second cam traversing structures,
   d) a drive-mechanism yoke having:
      (1) a central section having a device driving means cavity and a substantially centered drive rod bore that extends through said cavity, and
      (2) a first side having a first slot dimensioned to receive and pivotally retain the lower ends of said upper and lower arms and a second side having a second slot dimensioned to receive and pivotally retain the lower end of said second arm, and
   e) a device driving means that is powered by a powering means and that incorporates a linear actuating mechanism that attaches to the drive rod, wherein when said linear actuating mechanism is in a retracted position said first arm assembly and said second arm overlap into the interlocked position and conversely, when said linear actuating mechanism moves upward said drive rod moves upward causing said first and second cam traversing structures to move along the respective cam slot to cause said first arm assembly and said second arm to spread outward.

2. The device as specified in claim 1 wherein said means for forming a second arm space between said upper and lower arms comprise:
   a) an upper spacer attached, by an attachment means, near and between the upper ends of said upper and lower arm, and
   b) a lower spacer having a bore therethrough and concentrically positioned between the drive-mechanism yoke bores on said upper and lower arms.

3. The device as specified in claim 1 wherein said drive yoke further comprises:
   a) an upper section, a lower section, a center section from where extends rearward a drive rod and a central protrusion that extends outward from the center section, wherein a first slot is created between said upper section and said central protrusion, and a second slot is created between said lower section and said central protrusion, wherein through the first slot traverses the upper arm and through the second slot traverses the lower arm, an opposite third slot is created between said upper section and said lower section, wherein through the third slot traverses the second arm,
   b) a first bore that extends through the upper section, the central protrusion and the lower section and an opposite second bore that extends through the upper section and the lower section,
   c) a first cam traversing structure inserted through the first bore and through the cam slots on said first arm assembly and a second cam traversing structure inserted through the second bores and through the cam slot on said second arm, and
   d) means for securing said first and second cam traversing structures.

4. The device as specified in claim 1 wherein said drive-mechanism yoke further comprises:
   a) a central section having a device driving means cavity and a substantially centered drive rod bore that extends through said cavity, b) a first upper section and a first lower section wherein a first slot is created, a second upper section and a second lower section wherein a second slot is created, and c) a first pin bore that extends through said first upper section and said first lower section, a second pin bore that extends through said second upper section and said second lower section, wherein after the first pin bore is aligned sequentially with the drive-mechanism yoke bore on the upper arm, the second arm space means and the drive-mechanism yoke bore on the lower arm, a first swivel pin is inserted and attached by an attachment means, and wherein after the second pin bore is aligned sequentially with the drive-mechanism yoke bore on said second arm and the second pin bore on said second lower section, a second swivel pin is inserted and attached by an attachment means.

5. The device as specified in claim 1 wherein said upper and lower arms and the second arm are constructed of a heat treated steel.

6. The device as specified in claim 1 wherein said cam slot is cut in a convex shape.

7. The device as specified in claim 1 wherein said cam slot is cut in a concave shape.

8. The device as specified in claim 1 wherein said cam slot is cut in a linear shape.

9. The device as specified in claim 1 wherein said first cam traversing structure and said second cam traversing structure comprises a pin.

10. The device as specified in claim 1 wherein said first cam traversing structure and said second cam traversing structure comprises a roller.

11. The device as specified in claim 1 wherein to the inward end of said second arm is removably attached a cutting blade.

12. A spreading, crushing or cutting device comprising:

a) a first arm assembly comprising:
(1) an upper arm having:
(a) an upper substantially pointed end,
(b) a multiplicity of inward teeth and outward teeth,
(c) a lower end having therethrough a drive-mechanism yoke bore, and
(d) a cam slot,
(2) a lower arm substantially identical to said upper arm,
(3) an upper spacer attached, by an attachment means, near and between the upper ends of said upper and lower arms,
(4) a lower spacer having a bore therethrough and concentrically positioned between the drive-mechanism yoke bores on said upper and lower arms, wherein the upper and lower spacers form a second arm space between said upper and lower arms, b) a second arm having:
(1) an upper substantially pointed end,
(2) a multiplicity of inward and outward teeth,
(3) a lower end having therethrough a drive-mechanism yoke bore, and
(4) a cam slot, wherein said second arm has similar perimeter dimensions as said first arm and has a width which allows said second arm to slidably traverse the second arm space and interlock with the first arm assembly, c) a drive yoke having:
(1) an upper section having an upper surface, a lower surface that terminates at a center section, a first side end and a second side end,
(2) an integral lower section also having a lower surface, an upper surface that terminates at the center section, a first side end and a second side end,
(3) an integral central protrusion that extends outward from the center section and which has an upper surface and a lower surface, wherein a first slot is created between the lower surface of said upper section and the upper surface of said central protrusion, and wherein a second slot is created between the upper surface of said lower section and the lower surface of said central protrusion, wherein through the first slot traverses the upper arm of said first arm assembly and through the second slot traverses the lower arm of said first arm assembly,
(4) a third slot located opposite the first and second slots and created between the lower surface of said upper section and the upper surface of said lower section, wherein through the third slot traverses the second arm,
(5) an integral drive rod that extends rearward from the center section,
(6) a first pin bore located adjacent the first side ends and that extends through the upper section, the central protrusion and the lower section,
(7) a second pin bore located adjacent the second side ends and that extends through the upper section and the lower section,
(8) a first cam pin inserted through the first pin bore and through the cam slots on said first arm assembly,
(9) a second cam pin inserted through the second pin bores and through the cam slot on said second arm,
(10) means for securing said first and second cam pins, d) a drive-mechanism yoke having:
(1) a central section having a front surface, a rear surface, an upper surface, a lower surface, a first side and a second side,
(2) a device driving means cavity that extends inward from the rear surface of said central section,
(3) a substantially centered drive rod bore that extends through said cavity,
(4) a first upper section that integrally extends outward from the intersection of the upper surface and first side of said central section and having an outer end, an upper surface and a lower surface,
(5) a first lower section that integrally extends outward from the intersection of the lower surface and first side of said central section and having an outer end, an upper surface and a lower surface, wherein a first slot is created between the lower surface of said first upper section and the upper surface of said first lower section,
(6) a second upper section that integrally extends outward from the intersection of the upper surface and second side of said central section and having an outer end, an upper surface and a lower surface,
(7) a second lower section that integrally extends outward from the intersection of the lower surface and second side of said central section and having an outer end, an upper surface and a lower surface, wherein a second slot is created between the lower surface of said second upper section and the upper surface of said second lower section,
(8) a first pin bore that extends through said first upper section and said first lower section,
(9) a second pin bore that extends through said second upper section and said second lower section, wherein after the first pin bore is aligned sequentially with the drive-mechanism yoke bore on the upper arm, the lower spacer and the drive-mechanism yoke bore on the lower arm, a first swivel pin is inserted and attached by an attachment means, and wherein after the second pin bore is aligned sequentially with the drive-mechanism yoke bore on said second arm and the second pin bore on said second lower section, a second swivel pin is inserted and attached by an attachment means, e) a device driving means that incorporates a linear actuating mechanism that attaches to the drive rod attachment end on said drive rod, wherein when said linear actuating mechanism is in a retracted position said first arm assembly and said second arm overlap into the closed interlocked position and conversely, when said linear actuating mechanism moves upward said drive rod moves upward causing said first and second cam pins to move along the respective cam slot to cause said first arm assembly and said second arm to spread outward, f) means for powering said device driving means, g) a forward handle with a first end having a first handle bore and a second end having a second handle bore, wherein the first handle bore is inserted over the first pin bore prior to inserting and attaching the first swivel pin, wherein the second handle bore is inserted over the second pin bore prior to inserting and attaching the second swivel pin, and h) a hand grip, attached by an attachment means, to a rear section of said device driving means.

13. The device as specified in claim 12 wherein said cam slot is cut in a convex shape.

14. The device as specified in claim 12 wherein said cam slot is cut in a concave shape.

15. The device as specified in claim 12 wherein said cam slot is cut in a linear shape.

16. The device as specified in claim 12 wherein said first cam traversing structure and said second cam traversing structure comprises a roller.

17. The device as specified in claim 12 wherein to the inward end of said second arm is removably attached a cutting blade.

18. A spreading, crushing or cutting device comprising:

a) a first arm assembly having an upper arm and a lower arm each having a cam slot, b) a second arm having a cam slot, wherein said second arm slidably traverses between said upper and lower arms and interlocks therebetween, c) a drive yoke having a center section from where extends rearward a drive rod, a plurality of bores in alignment with the slots in said arms, a plurality of cam traversing structures inserted through the bores and interfacing with the cam slots on said arms, and means for securing said cam traversing structures, d) a drive-mechanism yoke having a central section having a device driving means cavity and a drive rod bore wherein said drive-mechanism yoke having dimensions to receive and retain said arms and, e) device driving means powered by a linear actuating mechanism attachable to the drive rod, wherein when said linear actuating mechanism is in a retracted position said first arm assembly and said second arm overlap into the interlocked position and conversely, when said linear actuating mechanism moves upward said drive rod moves upward causing said first and second cam traversing structures to move along the respective cam slot to cause said first arm assembly and said second arm to spread outward.

* * * * *